United States Patent
Burt et al.

[15] 3,658,105
[45] Apr. 25, 1972

[54] FASTENER DRIVING ARRANGEMENT

[72] Inventors: John Burt, 1870 Oakmont Drive, Glendale, Calif. 91208; Louis S. Lotgering, 334 W. Monterey Road, Corona, Calif. 91720

[22] Filed: May 4, 1970

[21] Appl. No.: 34,449

[52] U.S. Cl. ...............................................145/50 A, 85/45
[51] Int. Cl. ...............................................................B25b 15/00
[58] Field of Search .....................................145/50 A; 85/45

[56] References Cited

UNITED STATES PATENTS 3,540,342  11/1970  Vaughn ....................................85/45
2,182,568  12/1939  Olson........................................85/45

Primary Examiner—Andrew R. Juhasz
Assistant Examiner—Michael Koczo, Jr.
Attorney—Gausewitz & Carr

[57] ABSTRACT

A fastener driving arrangement in which there is a recess in the head of the fastener, having outwardly extending pockets with parallel sidewalls and bottom walls defined by spherical segments, the driver having blades adapted to fit in the recess pockets, the blades having end walls that are complementary to the inner recess wall and sidewalls which are adjacent the inner bottom corner of each recess pocket and diverge progressively away from the recess sidewall in both the radial and axial directions so that, when torque loads are applied, the recess wall will be caused to deflect to gradually increase the area of contact between the driver and recess.

15 Claims, 14 Drawing Figures

PATENTED APR 25 1972　　3,658,105

INVENTORS.
JOHN BURT
LOUIS S. LOTGERING
BY
Jansewitz & Carr
ATTORNEYS

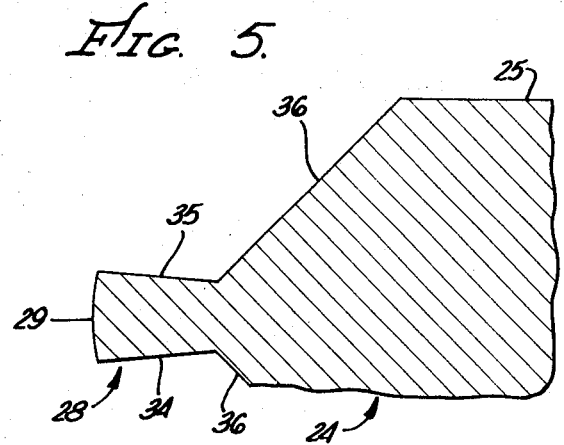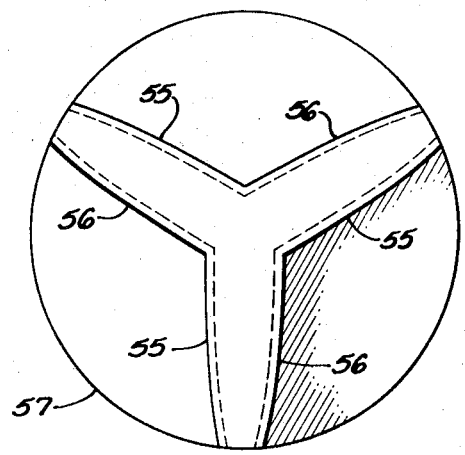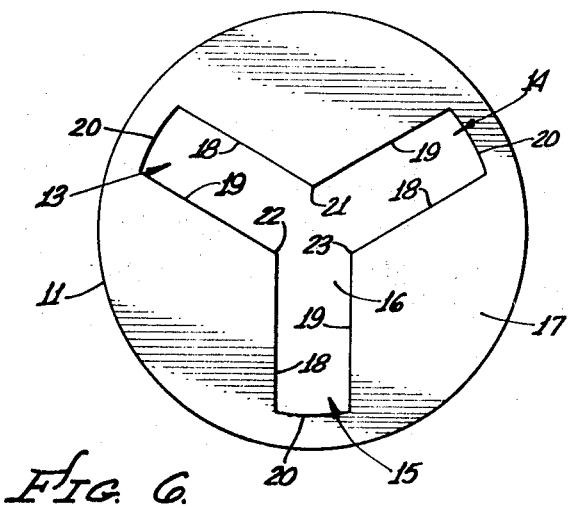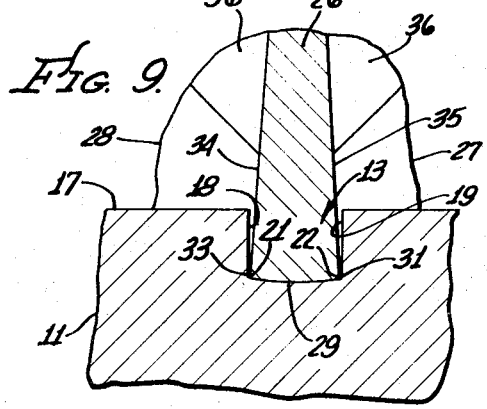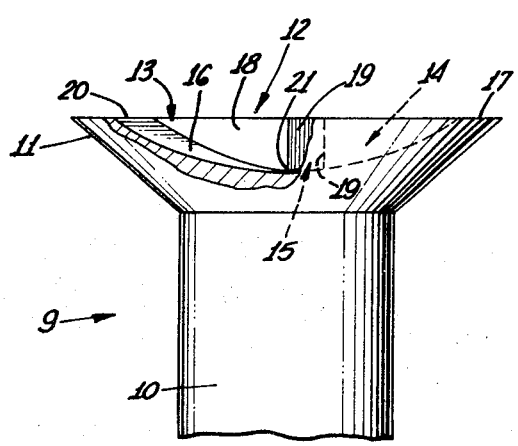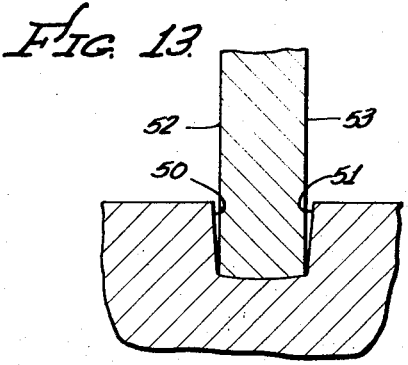

INVENTORS,
JOHN BURT
LOUIS S. LOTGERING
BY
ATTORNEYS

FASTENER DRIVING ARRANGEMENT

BACKGROUND OF THE INVENTION

1. The Field of the Invention

This invention pertains to a fastener driving arrangement.

The Prior Art

A continued problem for threaded or other rotatable fasteners has been the provision of a suitable wrenching arrangement for the installation and removal of the fasteners. The difficulties have been accentuated in the high-performance areas encountered in the aerospace industry in view of high torques and the magnitude of the loads to which the fasteners are subjected. Fasteners in this category normally include a driving recess in the head having some variation of a cruciform or similar shape. When torque is applied, the radially outer portions of the recess and the tips of the blades are caused to accept a major portion of the driving force, producing high unit loading that may lead to failure. The ability to withstand rotational forces has been limited. For some, the torque capabilities are much greater in one direction than the other, as a consequence of which the fastener cannot be loosened after it has been tightened to the limit. Fatigue failures of the driver or fastener are encountered upon repeated use with conventional recess designs. Another difficulty is that many recesses allow the driver to cam out of the recess during the wrenching operation, even where very high end loads are applied to attempt to hold the driver in place. Problems also are found in recess designs which cause a large amount of the material of the fastener head to be removed or displaced in the formation of the recess, resulting in a loss of strength for the fastener. Some recess constructions are relatively complex in shape, as a result of which both the driver and fastener are expensive to manufacture. Forging operations in producing these fasteners may not be possible.

SUMMARY OF THE INVENTION

The present invention provides a driver and fastener recess combination that is readily producible and results in greatly increased performance both for the fastener and for the driver. The recess in the driver head has a plurality of pockets, such as three or four, which extend radially outwardly from the axis of the fastener. The recess pockets join at the central portion of the recess. In the preferred embodiment, each recess has parallel sidewalls, while the bottom walls of the recess pockets are defined by a segment of a sphere. Therefore, for each pocket, the bottom wall approaches the end surface of the fastener head which it intersects at the outer edge of the recess pocket. This form of recess is shallow, removing a minimum amount of material from the head of the fastener, resulting in increased strength for the fastener. It readily is produced by a heading operation.

The driver, which may be manually or power driven, includes a plurality of blades, corresponding in number to the pockets of the recess in the fastener head. The blades have end surfaces that are spherical segments and complementary to the bottom walls of the recess pockets. The sidewalls of the blades intersect adjacent the axis of the driver. For each blade, the sidewalls converge outwardly in the radial direction. Also, they converge axially inwardly so that the blades are undercut. This configuration for the driver may be easily producible at a low cost.

When the driver is received in the recess, the corners where the blade sidewalls intersect each other and the end surface of the driver are positioned adjacent the corners of the intersecting sidewalls of the recess at the bottom of the recess. Because the blade sidewalls converge both radially and axially away from these corners at the end surface, they are displaced progressively further away from the recess sidewalls outwardly from the point of initial adjacency.

As a result of this construction, deflection occurs when torque is applied, causing an increasing area of contact between the walls of the driver and those of the recess as the torque becomes greater. The area of contact moves both radially and axially outwardly with respect to the pockets of the recess in the fastener. With the fastener normally being made of a material that is softer than that of the driver, the progressive increase in area contact occurs primarily from a deflection of the walls of the recess. Some driver blade deflection also takes place. Because the inner parts of the blades and recess adjacent the longitudinal axis receive the force that produces the deflection, these inner portions absorb a much greater proportion of the driving force than in conventional designs. This causes the greatest force to be applied where the fastener head is thickest and has more material available for resisting the applied loads. Likewise, the blades are loaded most heavily adjacent the axis where they are attached together and have the greatest strength. The load per unit area becomes more uniform radially of the recess than in other recess designs.

Also, in view of the configuration of the recess and driver including the undercut blade sidewalls, there is a minimum tendency of the driver to leave the recess as the torque is applied. Therefore, it is much easier to keep the driver in the recess, and it is not necessary to apply any substantial loads to maintain the engagement.

Not only does the fastener withstand the torquing loads much better than in conventional designs, but also the driver is much less susceptible to breakage. The fastener has a greater strength in tension, and fatigue resistance is improved significantly for both the driver and the fastener. Both fastener and driver life are vastly increased. With the symmetrical arrangement of the driver and recess, there is equal ability to withstand the torque loads when applied in either rotational direction. Therefore, the fastener can be removed as easily as it is installed.

BRIEF DESCRIPTION OF THE DRAWING

FIG. 5 is a fragmentary sectional view taken along line 5—5 of FIG. 2;

FIG. 6 is an end elevational view of the fastener;

FIG. 7 is a side elevational view, partially broken away, of the fastener;

FIG. 9 is an enlarged fragmentary sectional view taken along line 9—9 of FIG. 8;

FIG. 13 is a view similar to FIG. 9 illustrating a modified relationship of the sidewalls of the driver and recess; and FIG. 14 is an end elevational view of a driver having sidewalls convex outwardly in the radial direction.

DESCRIPTION OF THE PREFERRED EMBODIMENT

Figure 1:
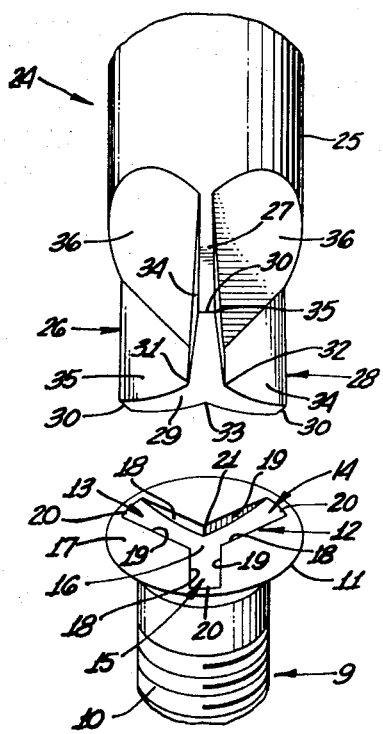
FIG. 1 is a perspective view of the fastener recess and driver combination of this invention.
Figure 2:
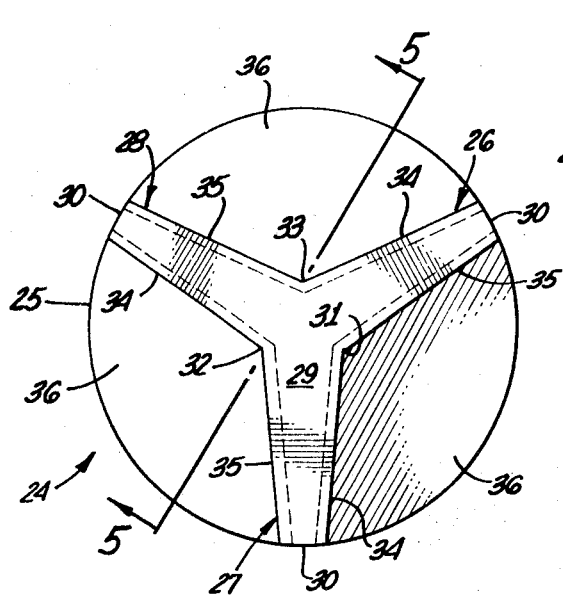
FIG. 2 is an enlarged end elevational view of the driver.
Figure 3:
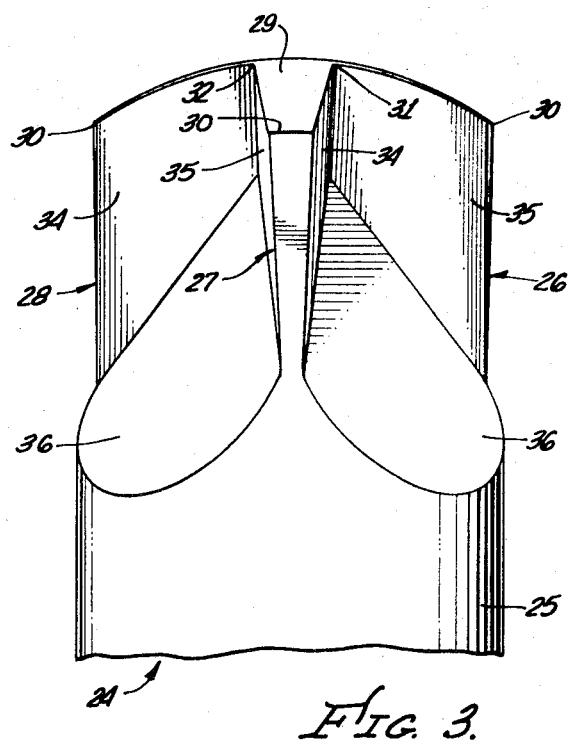
FIG. 3 is a side elevational view of the driver.
Figure 4:
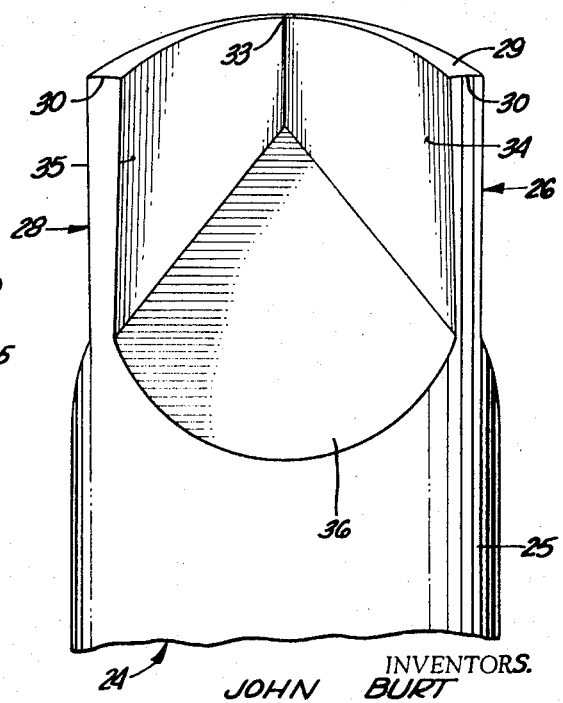
FIG. 4 is a side elevational view of the driver, taken from the side opposite that of FIG. 3.
Figure 10:
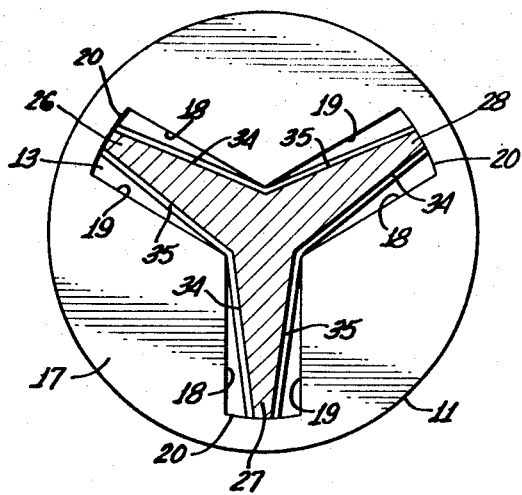
FIG. 10 is a sectional view taken along line 10—10 of FIG. 8.

As illustrated in FIGS. 1–10 of the drawing, a screw or bolt 9 is provided with a threaded shank 10 at one end of which is a frustoconical head 11. The latter portion of the fastener is adapted to be received in a complementary countersink in a structure for a flush installation. The invention may be used with other types of screw heads, as desired.

The recess 12 in the screw head 11 in this embodiment includes three identical pockets 13, 14 and 15, which are equally spaced apart angularly. These pockets diverge radially from the open central portion of the recess 12 at the longitudinal axis of the fastener 9. The bottom wall 16 of the recess is defined by a segment of a sphere, the center point of which is located some distance beyond the outer flat end surface 17 of the head 11. The bottom wall 16 is at its greatest depth at the longitudinal axis of the screw, but still provides a maximum recess depth that is substantially less than the thickness of the head 11.

The recess pockets 13, 14 and 15 include parallel sidewalls 18 and 19, which extend inwardly from the flat end surface 17 of the screw head to the bottom wall 16 of the recess in a direction parallel to the longitudinal axis of the screw 9. The sidewalls 18 and 19 extend outwardly from the central portion of the recess in a direction parallel to a radius of the fastener 9. The bottom wall 16 of the recess 12 intersects the end surface 17 at edges 20 that are at the radially outer ends of the recess pockets and interconnect the sidewalls 18 and 19. At the central portion of the recess 12, the sidewalls 18 and 19 of the recess pockets meet the bottom wall 16 at corners 21, 22 and 23.

This configuration of the recess is particularly advantageous in a flush-head screw as in the embodiment shown, being shallow so that a large amount of material remains in the screw head 11 after formation of the recess. Also, the bottom wall approaches the end surface 17 of the head 11 at the outer portions of the recess, so that the recess depth decreases outwardly where the frustoconical head becomes thinner.

The driving tool 24 includes a cylindrical shank 25, at the end of which are three radially extending blades 26, 27 and 28. The end surface 29 for the driver blades 26, 27 and 28 is convex and defined by a segment of a sphere which has the same radius as that of the sphere that defines the bottom wall 16 of the recess 12. The blades 26, 27 and 28 are equally spaced angularly and are of equal dimensions radially. An imaginary circle that includes the radially outer edges 30 of the end surface 29 (which has the same diameter as that of the shank 25 of the tool 24) is slightly larger than a similar circle along which the end edges 20 of the recess 12 fall.

At the driver end surface 29, the blades 26, 27 and 28 intersect at corners 31, 32 and 33 adjacent the longitudinal axis. From these inner corners, the blades taper toward their outer edges 30. In other words, the blades are thicker at their points of intersection near the longitudinal axis of the driver 24 than they are at the outer edges of the blades, and the opposite sidewalls 34 and 35 of the blades 26, 27 and 28 converge outwardly in the radial direction. Also, the sidewalls 34 and 35 of each blade converge in the axial direction away from the end surface 29. Thus, the blades are undercut. Three flat surfaces 36 are formed on the shank 25, inclining inwardly in the radial direction and outwardly toward the end of the driver, these surfaces being interposed between the adjacent blades. The surfaces between the adjacent blades may be in other forms, such as defining radial angular grooves to facilitate the manufacture of the driver. Other than having a slight effect on the strength of the driver shank, the shape of the surfaces between the blades does not influence the performance of the driver-recess combination. The thickness of each blade at the end surface 29 between its inner corners is substantially equal to the spacing between the parallel sidewalls 18 and 19 of the recess pockets.

When the end of the driver 24 is inserted into the recess 12, the end surface 29 of the driver complementarily engages the bottom wall of the recess. Also, the inner corners 31, 32 and 33 of the driver blades at the end surface 29 are brought substantially into adjacency with the sidewalls 18 and 19 of the recess pockets. This provides essentially point contact between the blade corners 31, 32 and 33 and the recess corners 21, 22 and 23 at the innermost part of the recess. All other portions of the driver blades are spaced from the sidewalls 18 and 19 of the recess pockets because the driver blades are undercut, tapering axially inwardly from the outer end surface 29, and also tapering radially outwardly toward the edges 30 of the driver blades. This relationship may be seen in particular in FIG. 10.

When a torque is applied to the driver 24 in rotating the screw 9, the contact between the driver and the screw at the recess increases. This occurs principally because the recess sidewalls deflect as a result of the rotational force exerted on the driver and the resistance to movement generated by the screw. The extent of the area of contact between the sidewalls of the blades and the recess depends upon the amount of torque applied. The higher the torque, the greater the deflection and the more area in engagement. This deflection causes portions of the blade sidewalls radially outward of the initial points of contact to be moved over against the sidewalls of the recess pockets. At the same time, this deflection causes the portions of the sidewalls of the blades axially inward of the corners 31, 32 and 33 to be brought into engagement with the recess sidewalls.

Figure 11:
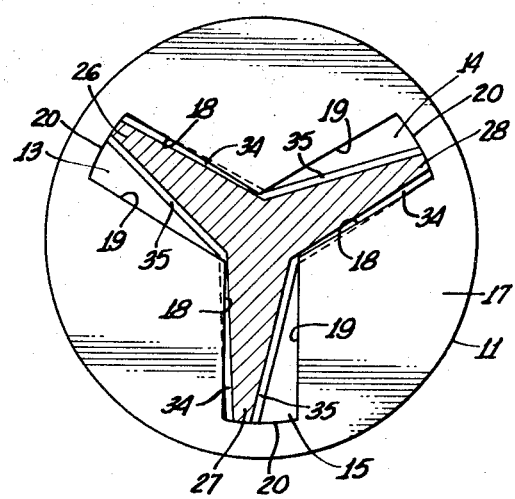
FIG. 11 is a view similar to FIG. 10, but showing the parts in the position assumed upon the application of torque.
Figure 8:
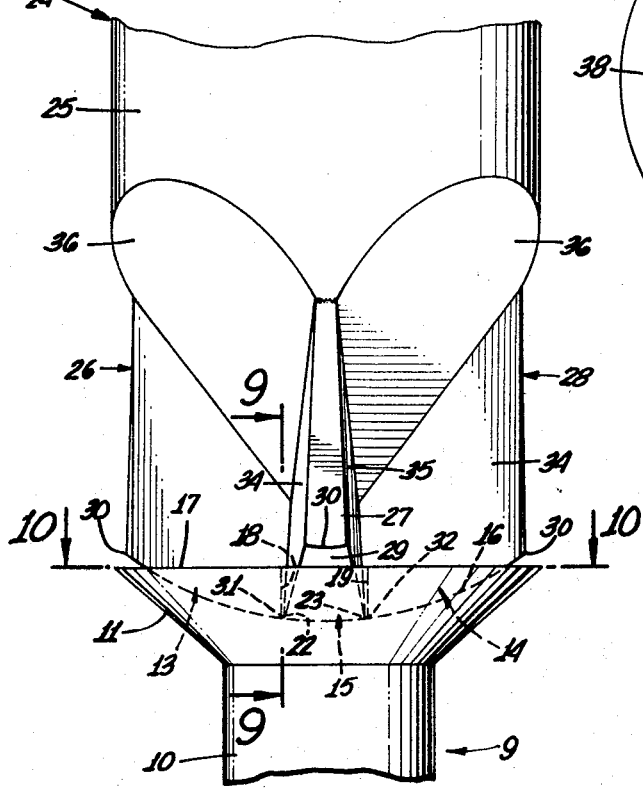
FIG. 8 is a side elevational view showing the driver in engagement with the fastener.

When a clockwise torque is applied to the driver 24, therefore, the engagement between the blade sidewalls 34 and the recess sidewalls 18 will spread from the bottom of the recess at the corners 21, 22 and 23 both radially and axially outwardly along the recess sidewalls 18. FIG. 11 illustrates how the area of engagement between the wall of the recess and that of the driver blade has increased upon the application of a clockwise torque. In this view, there is a substantial area of contact between the blade and recess sidewalls, but outer portions of the blades remain spaced from the recess sidewalls 18. An even greater torque will produce additional deflection and cause the full area of the recess sidewalls 18 to be contacted by the blade sidewalls 34.

This progressive increase in area contact causes the driving force to be applied initially at the inner portions of the recess at the locations where the fastener head provides maximum thickness of the material for absorbing the forces applied. With the outer portions of the recess and the driver blades being brought into interengagement only upon deflection of the inner portions of the recess, a greater percentage of the total imposed load is taken by the sidewalls at the inner portions of the recess than otherwise would be the case. Consequently, under all torque loads on the recess, an increased proportion of the torque is taken out through the portions of the fastener head having the greatest amount of material and, hence, the greatest strength for absorbing the force applied. Also, the driver receives higher loading at the inner ends of the blades, where they intersect and the load-carrying capacity is maximum. As a result, the fastener and driver combination will withstand considerably higher torque loads than are possible with previous recess designs.

With the driver being undercut to cause higher unit loading at the bottom of the recess, the driver will tend to stay in the recess even under maximum torque loads, rather than camming out as is characteristic of many conventional recess and driver configurations. These improved results are possible with a shallow recess that extends into the fastener head a distance substantially less than the total thickness of the head. This characteristic, in turn, adds to the strength of the driver and recess combination because a minimum amount of material must be removed from the head in forming the recess and from the driver in forming the driving blades.

The driver and recess combination of this invention operates equally satisfactorily for rotation in either direction. The same phenomenon of sidewall deflection takes place for rotation in the counterclockwise direction as the sidewalls 35 of the blade are progressively moved into engagement with radially and axially outer portions of the recess sidewalls 19. The symmetrical construction means that all the torquing capabilities and other advantages are the same for removal of the fastener as well as for installing it.

Figure 12:
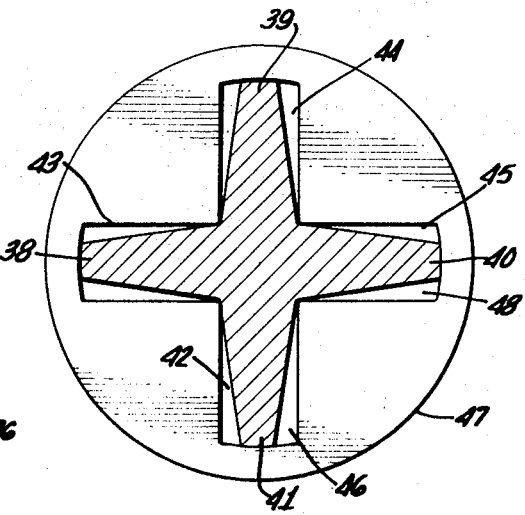
FIG. 12 is a view similar to FIG. 10, but showing an embodiment that utilizes four blades on the driver and four pockets in the recess.

In the embodiment described above, the recess has three outwardly extending pockets and the driver has three corresponding blades. However, the combination may be constructed with different numbers of recess pockets and blades. For example, as shown in FIG. 12, there are four blades 38, 39, 40 and 41 on the driver 42 that are adapted to fit in four pockets 43, 44, 45 and 46 of the recess in the fastener head 47. Other than a change in number and spacing, the arrangement of the blades and recess pockets will be the same as in the previously described embodiments. Thus, the blades 38, 39, 40 and 41 have undercut sidewalls and an end wall that is complementary to the spherical bottom wall 48 of the recess. The sidewalls of the recess pockets 43, 44, 45 and 46 are parallel, and the longitudinal axes of the recess pockets are radial. The performance advantages are the same for the four-bladed design as where three blades or some other number are employed.

It is preferred to use parallel sidewalls in the recess pockets, together with undercut sidewalls on the blades, as a construction simple to manufacture, yet which will result in the desired progressive increase in area contact, together with an absence of a tendency for the driver to cam out of the recess. It is possible, however, to achieve the results of the increasing area of contact under torque load by different configurations of the recess and blade walls. The important consideration is that the blade sidewalls diverge from the recess sidewalls so that the area of contact increases under torque. In the arrangement shown in FIG. 13, the sidewalls 50 and 51 of the recess are convergent toward the bottom of the recess, while the sidewalls 52 and 53 of the driver blade are parallel to the longitudinal axis of the driver. This can produce the same progressive area of contact as in the preferred embodiment, but there is more tendency for the blade to cam out of the recess under load in view of the fact that the recess is wider toward its outer end as viewed axially.

In addition, rather than having the blade sidewalls converge outwardly in the radial direction while the recess sidewalls are parallel radially, the blade sidewalls may be parallel while the recess sidewalls diverge radially outwardly.

The driver and recess combination may be modified further to produce an even greater percentage of the torque load at the inner portions of the driver blades and recess. This may be accomplished by the arrangement shown in FIG. 14, where the sidewalls 55 and 56 of the blades of the driver 57 are convex outwardly in the radial direction. They converge radially outwardly and axially inwardly as before, differing only by the convexity. When the driver 57 is used with the straight-sided recess of FIGS. 6 and 7, there is a greater deflection and resulting higher concentration of driving torque applied adjacent the longitudinal axis of the driver and the fastener.

In the embodiments shown and described above, the bottom wall of the recess and the end surface of the driver are spherical segments. However, it is not necessary that they have this configuration in order to provide the advantages of this invention as, for example, the end surfaces may be made up of flat segments. The considerations of primary importance relate to the relationship of the driver and recess sidewalls rather than to the shape of the end surfaces.

The foregoing detailed description is to be clearly understood as given by way of illustration and example only, the spirit and scope of this invention being limited solely by the appended claims.

We claim:

1. In combination with a rotatable fastener, an arrangement for driving said fastener comprising
    a portion of said fastener defining a recess,
        said recess having a central portion and additional portions extending radially outwardly from said central portion,
            said additional portions including sidewall means having inner ends at said central portion and extending radially outwardly therefrom to a location remote from said central portion,
    and a rotatable driver,
        said driver including blade means in said recess,
            said blade means having sidewall portions in said additional portions of said recess opposed to said sidewall means of said recess,
                said sidewall portions of said blade means being engageable with said sidewall mean of said recess adjacent said central portion of said recess for transmitting relatively low torque from said driver to said fastener at a location relatively adjacent said central portion of said recess upon the application of a relatively low torque to said driver, said sidewall portions of said blade means being normally spaced from said sidewall means of said recess at said location remote from said central portion, whereby said relatively low torque is received by said fastener adjacent said central portion and not at said location remote from said central portion,
            said fastener being deflectable at said sidewall means of said recess for causing said sidewall portions of said blade means additionally to engage said sidewall means of said recess at said location remote from said central portion upon the application of a relatively high torque from said driver to said fastener, for thereby providing an increased area of contact between said sidewall portions of said blade means and said sidewall means of said recess, while receiving relatively great amounts of said torque adjacent said central portion and relatively small amounts of said torque at said location remote from said central portion.

2. A device as recited in claim 1 in which
    said portion of said fastener includes an end surface,
        said recess extending inwardly from said end surface,
    and in which said recess includes an axially inner wall intersecting said sidewall means,
        said axially inner wall extending outwardly from said central portion and intersecting said end surface at a location remote from said central portion.

3. A device as recited in claim 1 in which said sidewall portions of said blade means are convex outwardly from said central portion.

4. A device as recited in claim 1 in which said sidewall portions of said blade means diverge progressively away from said sidewall means of said recess both radially and axially outwardly of said central portion.

5. In combination with a rotatable fastener, an arrangement for driving said fastener comprising
    a portion of said fastener defining a recess,
        said recess having a central portion and additional portions radially outwardly of said central portion,
            said additional portion having sidewall means extending to said central portion,
                said sidewall means being substantially parallel to the longitudinal axis of said fastener,
    and a rotatable driver,
        said driver having blade means in said recess for rotation of said fastener,
            said blade means diverging progressively away from said sidewall means of said recess both radially and axially outwardly of said central portion so that said blade means have sidewall portions relatively adjacent said sidewall means at said central portion of said recess,
            said sidewall portions of said blade means being relatively remote from said sidewall means of said recess at locations outwardly of said central portion,
            said sidewall portions of said blade means being inclined relative to the longitudinal axis of said driver,
                whereby said blade means is undercut, said sidewall means of said recess being deflectable upon the application of torque by said driver for causing additional portions of said sidewall portions of said blade means to be brought into engagement with said sidewall means of said recess.

6. A device as recited in claim 1 in which
    said recess is relatively deep at said central portion, and relatively shallow at said location remote from said central portion, whereby said sidewall means of said recess present greater area adjacent said central portion than the areas thereof remote from said central portion.

7. A device as recited in claim 6 in which said fastener includes a head,
said portion of said fastener defining a recess being in said head,
said head being relatively thick adjacent said central portion of said recess and relatively thin at said location remote from said central portion, whereby said head has greater strength adjacent said central portion than at said location remote from said central portion.

8. A device as recited in claim 7 in which said recess includes an axially inner surface,
said sidewall means of said recess being connected to said inner surface,
said sidewall portions of said blade means normally being relatively closer to said sidewall means of said recess adjacent the intersection of said inner surface with said sidewall means of said recess than at portions of said recess axially outwardly of said intersection.

9. In combination with a rotatable fastener, an arrangement for driving said fastener rotationally comprising a portion of said fastener defining a recess,
said recess having a central portion and a plurality of pockets extending generally radially outwardly from said central portion,
each of said pockets having opposed sidewalls and a bottom wall,
and a rotatable driver,
said driver having a generally radially extending blade for each of said pockets of said recess,
each of said blades being adapted to enter one of said pockets,
each of said blades having opposite sidewalls and an end wall interconnecting said sidewalls,
each of said blades when received in a pocket of said recess, with said end wall of said blade adjacent said bottom wall of said recess, having a portion adjacent said central portion of said recess and said bottom wall of said recess which is in juxtaposition with an adjacent sidewall of said recess for transmitting relatively low torque from said driver to said fastener,
the sidewall of said blade normally diverging progressively away from said adjacent sidewall of said recess radially and axially outwardly from said portion of said blade so in juxtaposition so that said sidewall of said blade normally is spaced from said adjacent sidewall of said recess other than at said portion so in juxtaposition,
said fastener being deflectable at said recess so as to cause additional portions of said sidewall of said blade to engage other portions of said sidewall of said recess upon the application of relatively high torque from said driver to said fastener, whereby said additional portions of said sidewall of said blade assist in transmitting portions of said relatively high torque to said other portions of said sidewall of said recess.

10. A device as recited in claim 9 in which
said blades interconnect adjacent the axis of said driver,
said end walls of said blades being spherical segments with the same center point and radius,
and said bottom walls interconnect at said central portion of said recess,
said bottom walls being spherical segments with the same center point and radius, said bottom walls being substantially complementary to said end walls of said blade.

11. In combination with a rotatable fastener, an arrangement for driving said fastener rotationally comprising
a portion of said fastener defining a recess,
said recess having a central portion and a plurality of pockets extending generally radially outwardly from said central portion,
each of said pockets having opposed sidewalls and a bottom wall,
said sidewalls of each of said pockets being substantially parallel in the radial direction,
and a rotatable driver,
said driver having a generally radially extending blade for each of said pockets of said recess,
each of said blades being adapted to enter one of said pockets,
each of said blades having opposite sidewalls and an end wall interconnecting said sidewalls,
said sidewalls of each of said blades converging radially outwardly,
each of said blades when received in a pocket of said recess, with said end wall of said blade adjacent said bottom wall of said recess, having a portion adjacent said central portion of said recess and said bottom wall of said recess which is in juxtaposition with an adjacent sidewall of said recess,
the sidewall of said blade diverging progressively away from said adjacent sidewall of said recess radially and axially outwardly from said portion of said blade so in juxtaposition.

12. In combination with a rotatable fastener, an arrangement for driving said fastener rotationally comprising
a portion of said fastener defining a recess,
said recess having a central portion and a plurality of pockets extending generally radially outwardly from said central portion,
each of said pockets having opposed sidewalls and a bottom wall,
said sidewalls of each of said pockets being parallel to the axis of said fastener,
and a rotatable driver,
said driver having a generally radially extending blade for each of said pockets of said recess,
each of said blades being adapted to enter one of said pockets,
each of said blades having opposite sidewalls and an end wall interconnecting said sidewalls,
said sidewalls of each of said blades converging axially inwardly of said end wall of said blades,
each of said blades when received in a pocket of said recess, with said end wall of said blade adjacent said bottom wall of said recess, having a portion adjacent said central portion of said recess and said bottom wall of said recess which is in juxtaposition with an adjacent sidewall of said recess,
the sidewall of said blade diverging progressively away from said adjacent sidewall of said recess radially and axially outwardly from said portion of said blade so in juxtaposition.

13. A device as recited in claim 9 in which
said sidewalls of adjacent blades interconnect so as to provide corners at said end walls,
said sidewalls of adjacent ones of said pockets interconnect at said central portion so as to provide a corner at said bottom wall of said recess,
said corners of said driver being adjacent said corners of said recess when said blades are so received in said recess for thereby providing said portions of said driver in juxtaposition with said portions of said recess.

14. In combination with a rotatable fastener, an arrangement for driving said fastener rotationally comprising
a portion of said fastener defining a recess,
said recess having a central portion and a plurality of pockets extending generally radially outwardly from said central portion,
each of said pockets having opposed sidewalls and a bottom wall,
and a rotatable driver,
said driver having a generally radially extending blade for each of said pockets of said recess, each of said blades being adapted to enter one of said pockets, each of said blades having opposite sidewalls and an end wall interconnecting said sidewalls, said sidewalls of said blades being convex outwardly in the radial direction, each of said blades when received in a pocket of said recess, with said end wall of said blade adjacent said bottom wall of said recess, having a portion adjacent said central portion of said recess and said bottom wall of said recess which is in juxtaposition with an adjacent sidewall of said recess, the sidewall of said blade diverging progressively away from said adjacent sidewall of said recess radially and axially outwardly from said portion of said blade so in juxtaposition.

15. A device as recited in claim 8 in which said sidewall portions of said blade means normally are closer to said sidewall means of said recess at the intersection of said sidewall means of said recess with said inner surface of said recess at said central portion than at any other location.

* * * * *